US011588550B2

(12) United States Patent
Sugiyama et al.

(10) Patent No.: US 11,588,550 B2
(45) Date of Patent: Feb. 21, 2023

(54) OPTICAL TRANSMISSION DEVICE AND OPTICAL TRANSMISSION SYSTEM

(71) Applicant: FUJITSU LIMITED, Kawasaki (JP)

(72) Inventors: Junichi Sugiyama, Kawasaki (JP); Yuji Ikegami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/526,005

(22) Filed: Nov. 15, 2021

(65) Prior Publication Data

US 2022/0278747 A1 Sep. 1, 2022

(30) Foreign Application Priority Data

Mar. 1, 2021 (JP) ............................ JP2021-031566

(51) Int. Cl.

| | |
|---|---|
| ***H04B 10/079*** | (2013.01) |
| ***H04B 10/40*** | (2013.01) |
| ***H04L 7/00*** | (2006.01) |
| ***H04B 10/69*** | (2013.01) |
| ***H04L 49/90*** | (2022.01) |
| ***H04B 10/516*** | (2013.01) |

(52) U.S. Cl.

CPC ......... *H04B 10/0791* (2013.01); *H04B 10/40* (2013.01); *H04B 10/5161* (2013.01); *H04B 10/69* (2013.01); *H04L 7/0075* (2013.01); *H04L 49/90* (2013.01)

(58) Field of Classification Search

CPC ................ H04B 10/0791; H04B 10/40; H04B 10/5161; H04B 10/69; H04L 7/0075; H04L 49/90

USPC .......................................................... 398/22

See application file for complete search history.

(56) References Cited

U.S. PATENT DOCUMENTS

| | | | | |
|---|---|---|---|---|
| 6,512,616 B1 * | 1/2003 | Nishihara | H04Q 11/0005 | 398/154 |
| 7,139,475 B1 * | 11/2006 | Kim | H04J 3/062 | 398/154 |
| 7,809,275 B2 * | 10/2010 | Aronson | H04L 25/242 | 398/135 |
| 2003/0067656 A1 * | 4/2003 | Gentile | H04B 10/07955 | 398/154 |
| 2007/0030936 A1 * | 2/2007 | Johnson | H03L 7/0816 | 375/371 |

(Continued)

FOREIGN PATENT DOCUMENTS

JP 2012-034030 A 2/2012

*Primary Examiner* — Dalzid E Singh

(74) *Attorney, Agent, or Firm* — Fujitsu Patent Center

(57) ABSTRACT

An optical transmission device includes: a first receiver circuit, a second receiver circuit, a switch circuit, a terminator circuit, a packet buffer, a clock generator, and a signal generator. The first receiver circuit converts an optical signal received via a first route into a first electric signal. The second receiver circuit converts an optical signal received via a second route into a second electric signal. The switch circuit selects the first electric signal or the second electric signal. The terminator circuit extracts a packet from an electric signal selected by the switch circuit. The packet buffer stores the packet extracted by the terminator circuit. The clock generator generates a clock signal. The signal generator generates a continuous signal that includes the packet stored in the packet buffer by using the clock signal.

8 Claims, 13 Drawing Sheets

(56) References Cited

U.S. PATENT DOCUMENTS

2012/0099859 A1* 4/2012 Watanabe .......... H04Q 11/0005 398/45
2015/0155963 A1* 6/2015 Tang ...................... H04B 10/40 398/83

* cited by examiner

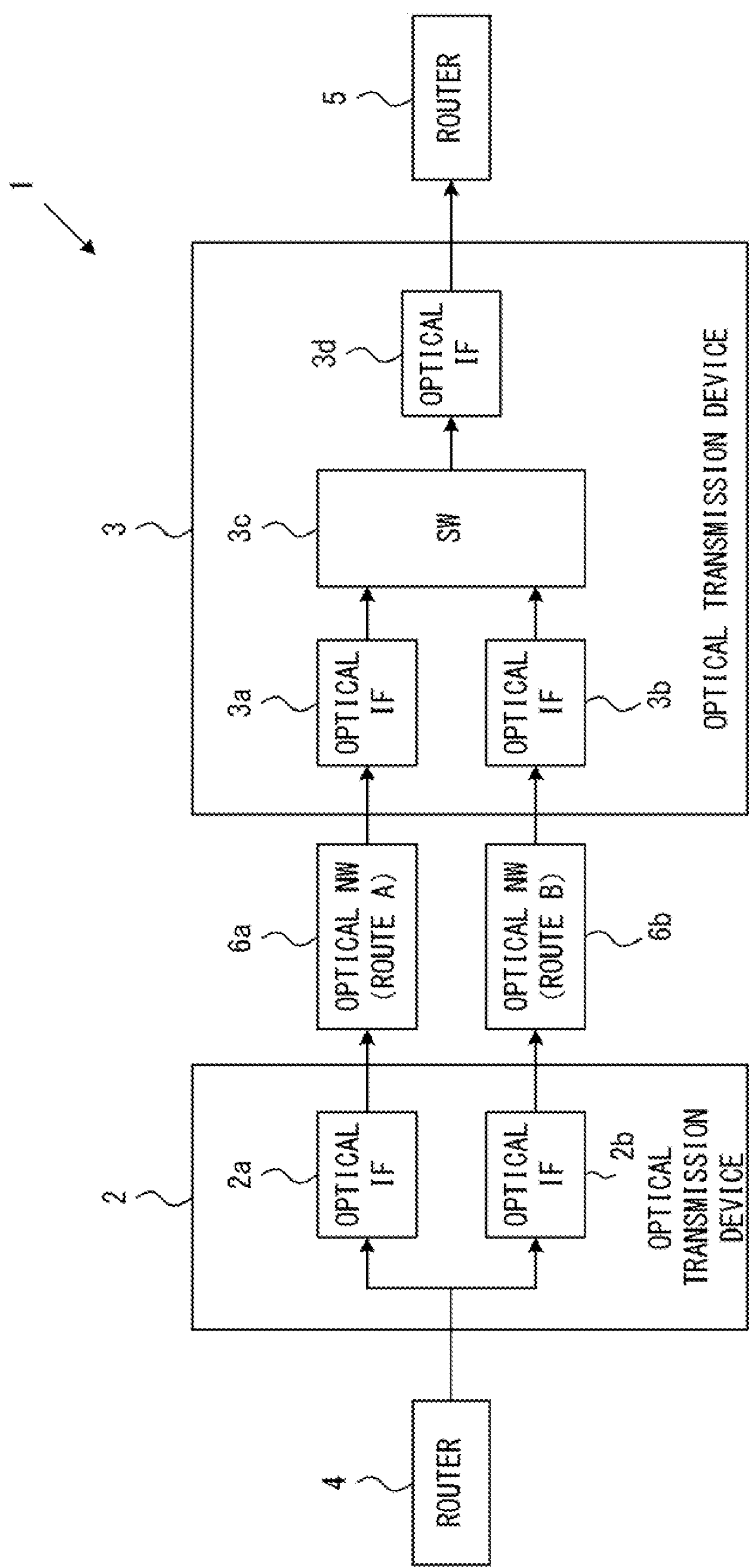
F I G. 1

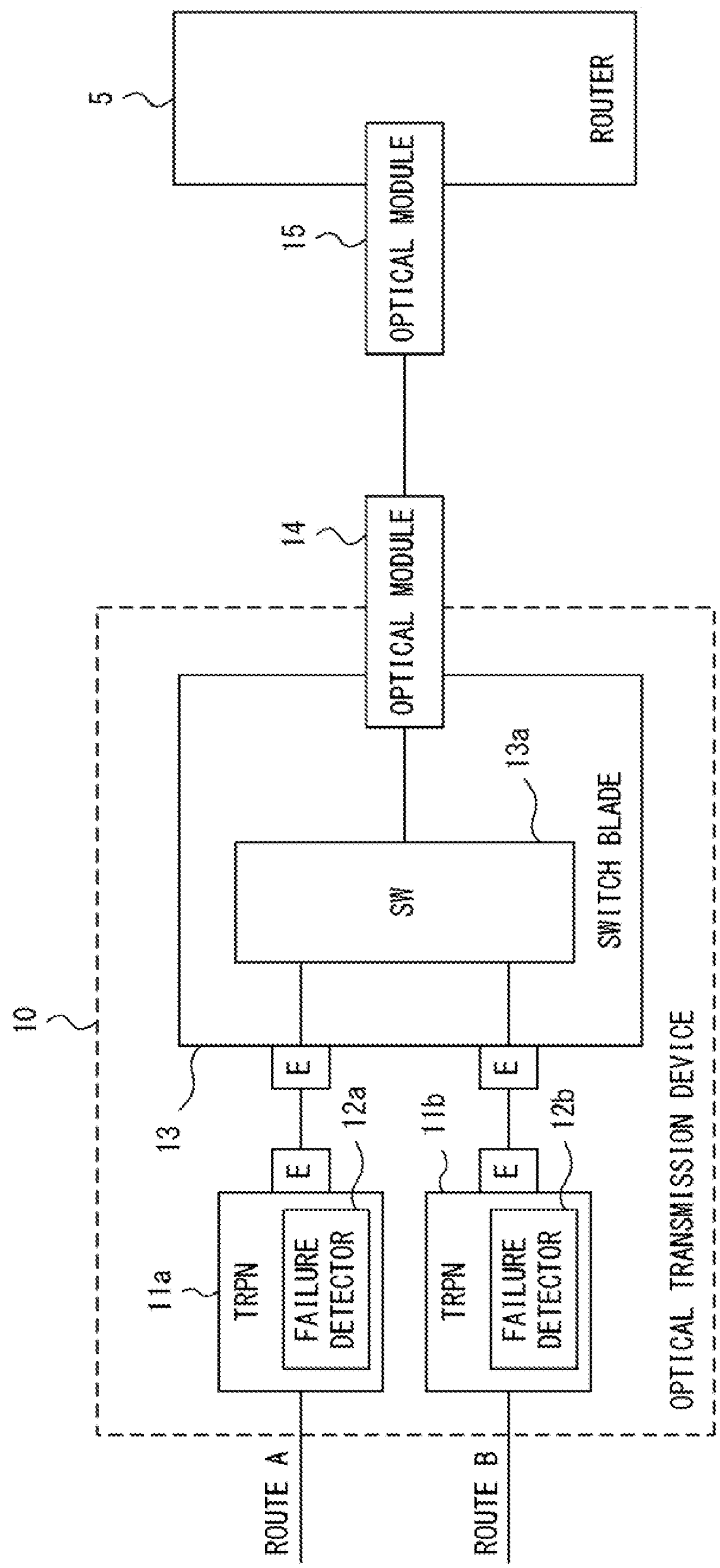
F I G. 2

F I G. 3A
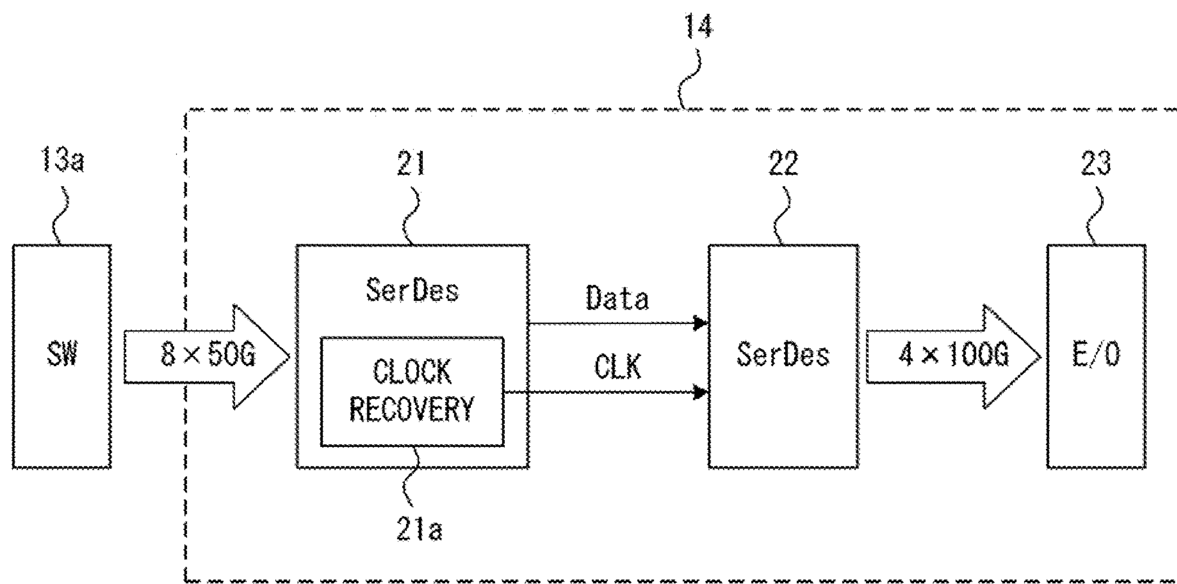
F I G. 3B
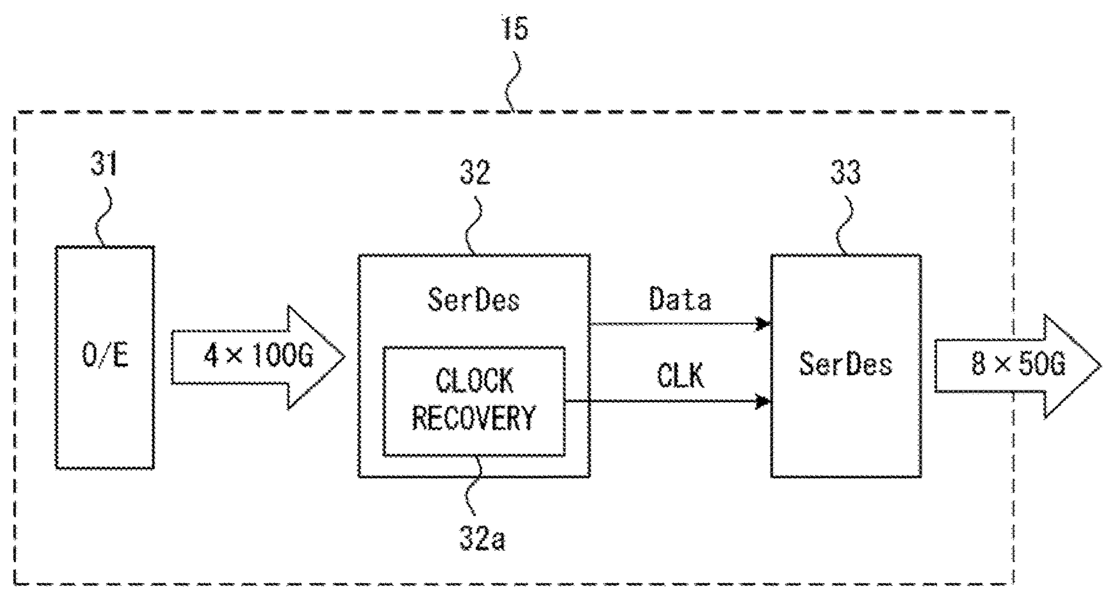

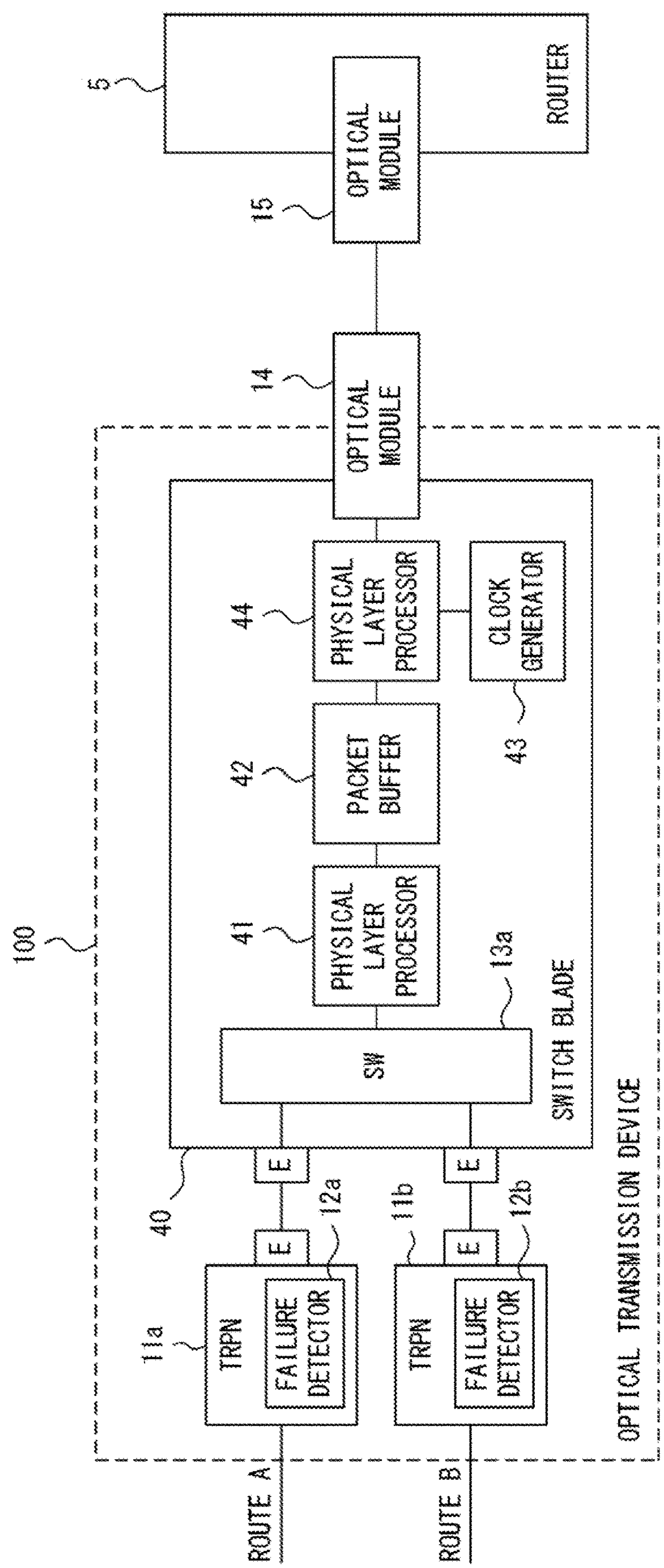
F I G. 4

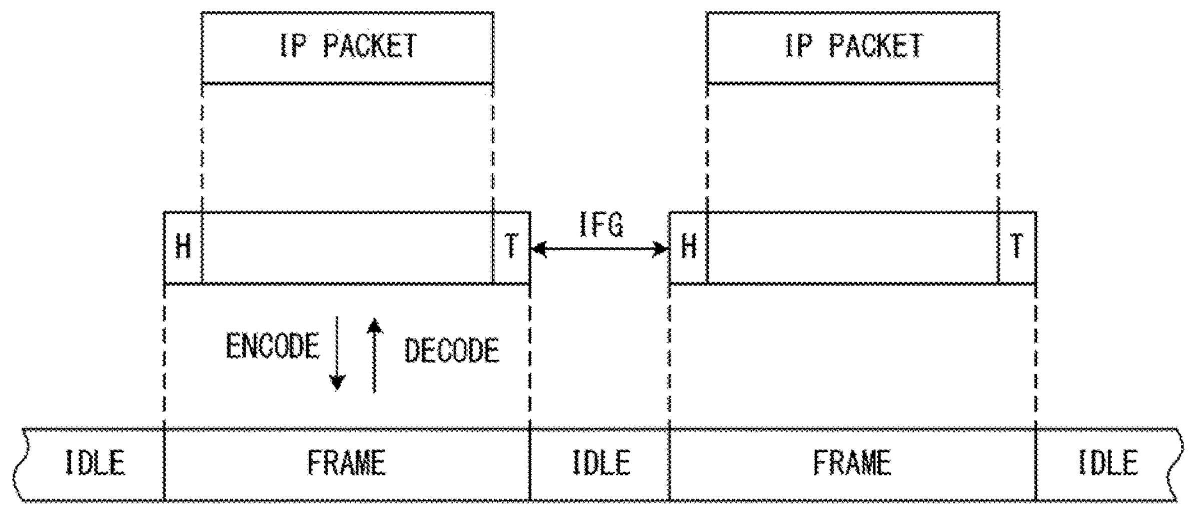
F I G. 6

<EXAMPLE FOR COMPARISON>
<SWITCH INPUT A>
... | I | PA | I | PA | I | PA | I | PA | I | →
<SWITCH INPUT B>
... | I | PB | I | PB | I | PB | I | PB | I | →
<SWITCH OUTPUT>
NO-SIGNAL SECTION
... | I | PB | I | PB | | I | PA | I | PA | I | →
<OUTPUT OF OPTICAL MODULE 14>
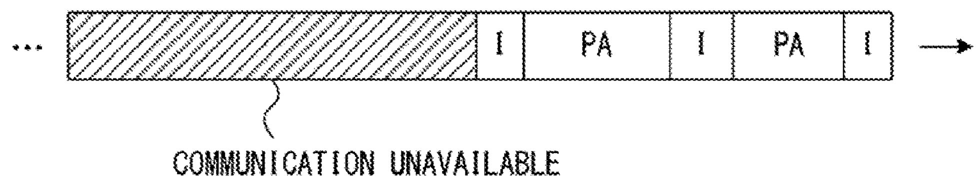
F I G. 7

<EMBODIMENT OF PRESENT INVENTION>
<SWITCH INPUT A>
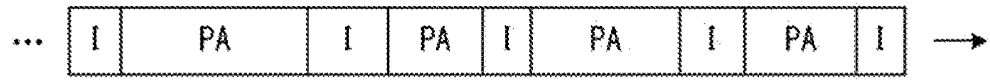
<SWITCH INPUT B>
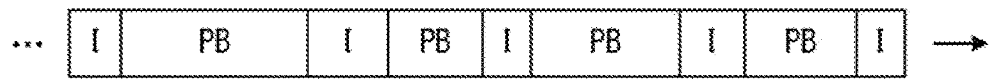
NO-SIGNAL SECTION
<SWITCH OUTPUT>
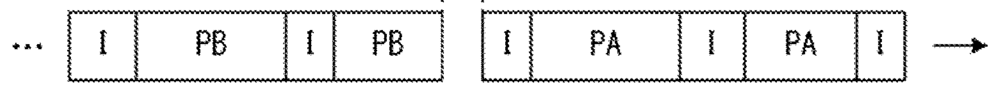
<OUTPUT OF PHYSICAL LAYER PROCESSOR 44>
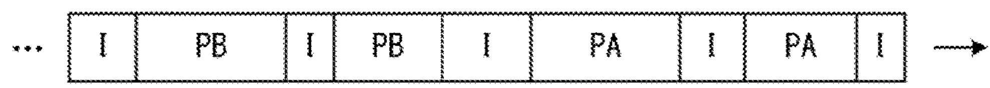
<OUTPUT OF OPTICAL MODULE 14>
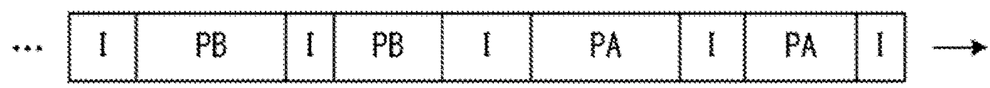
FIG. 8

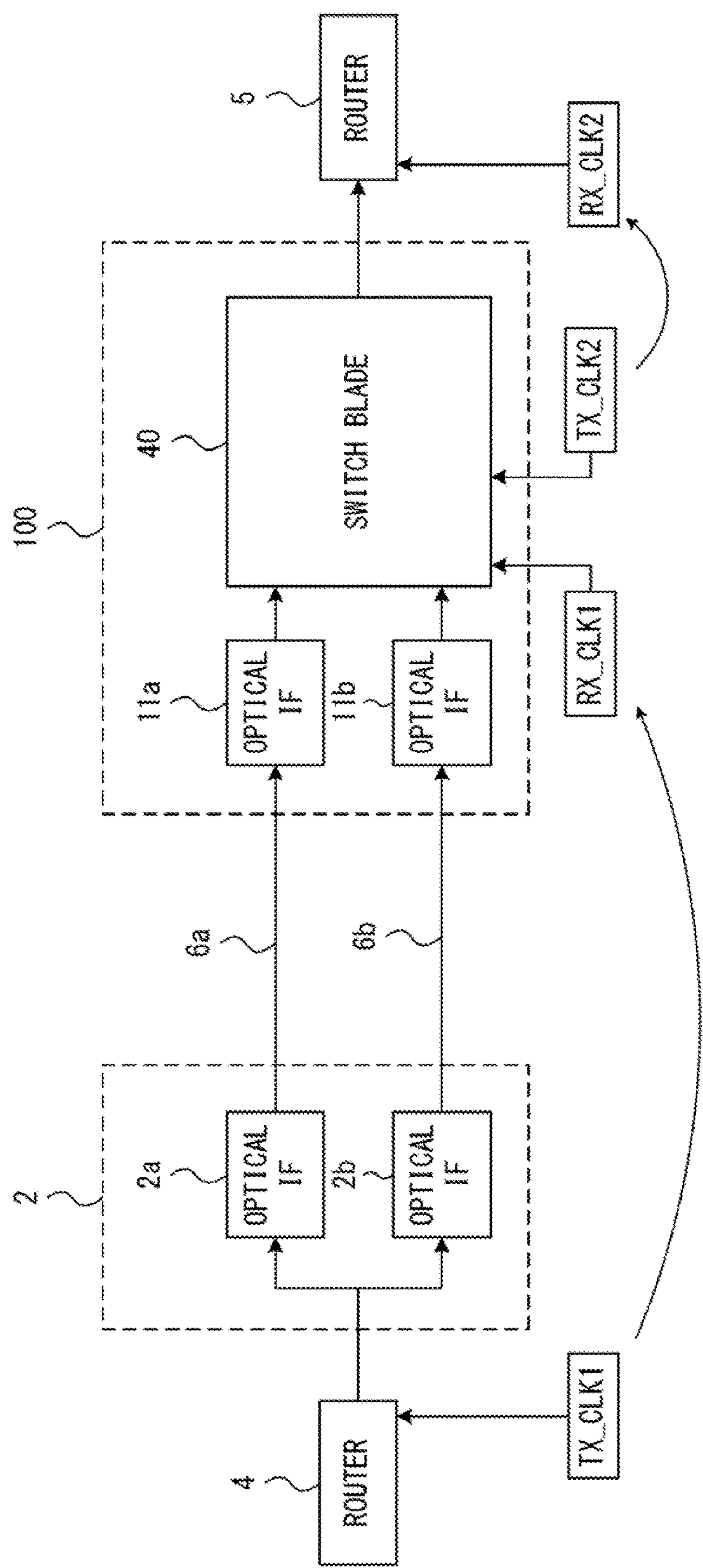
F I G. 1 0

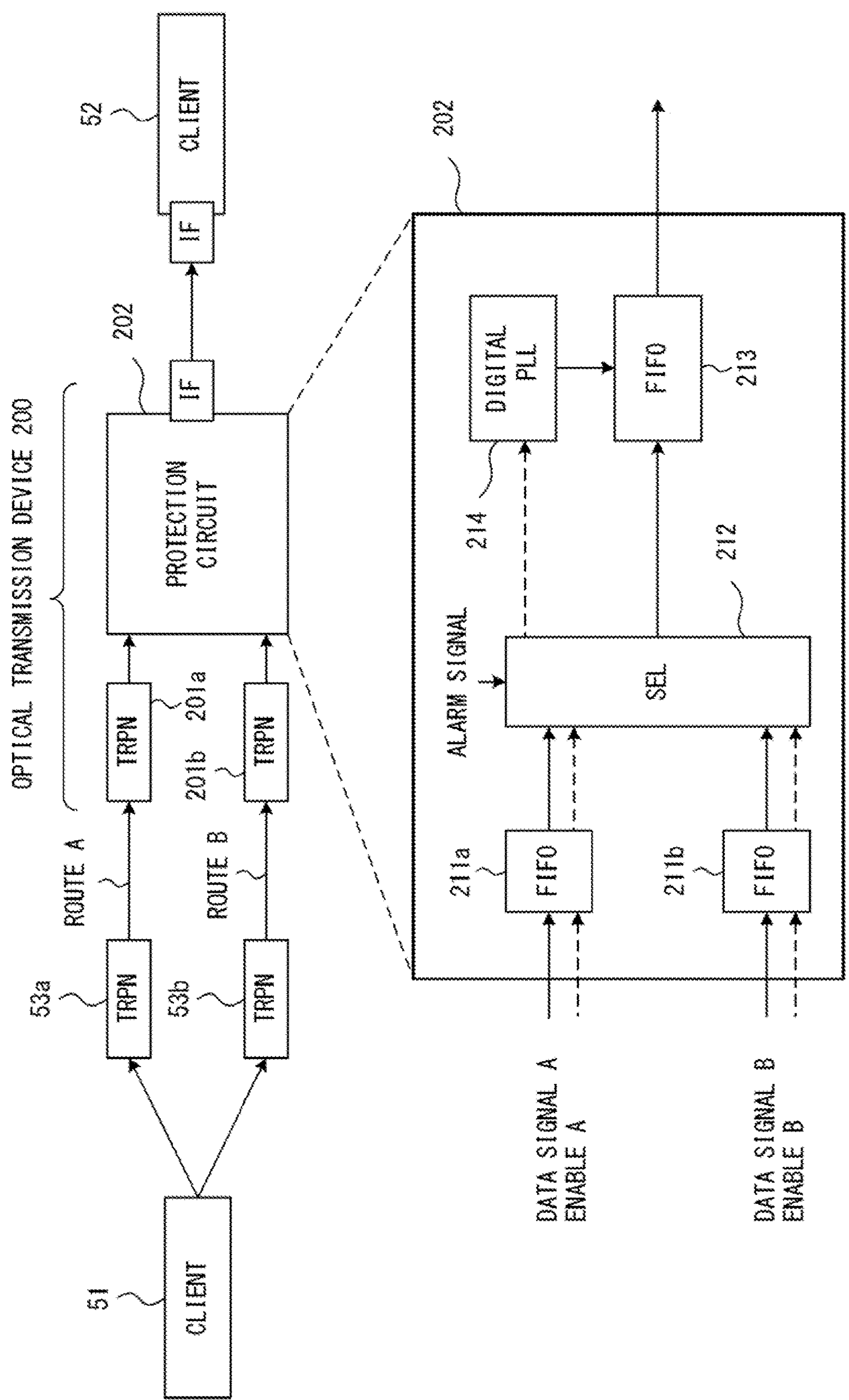
F I G. 11

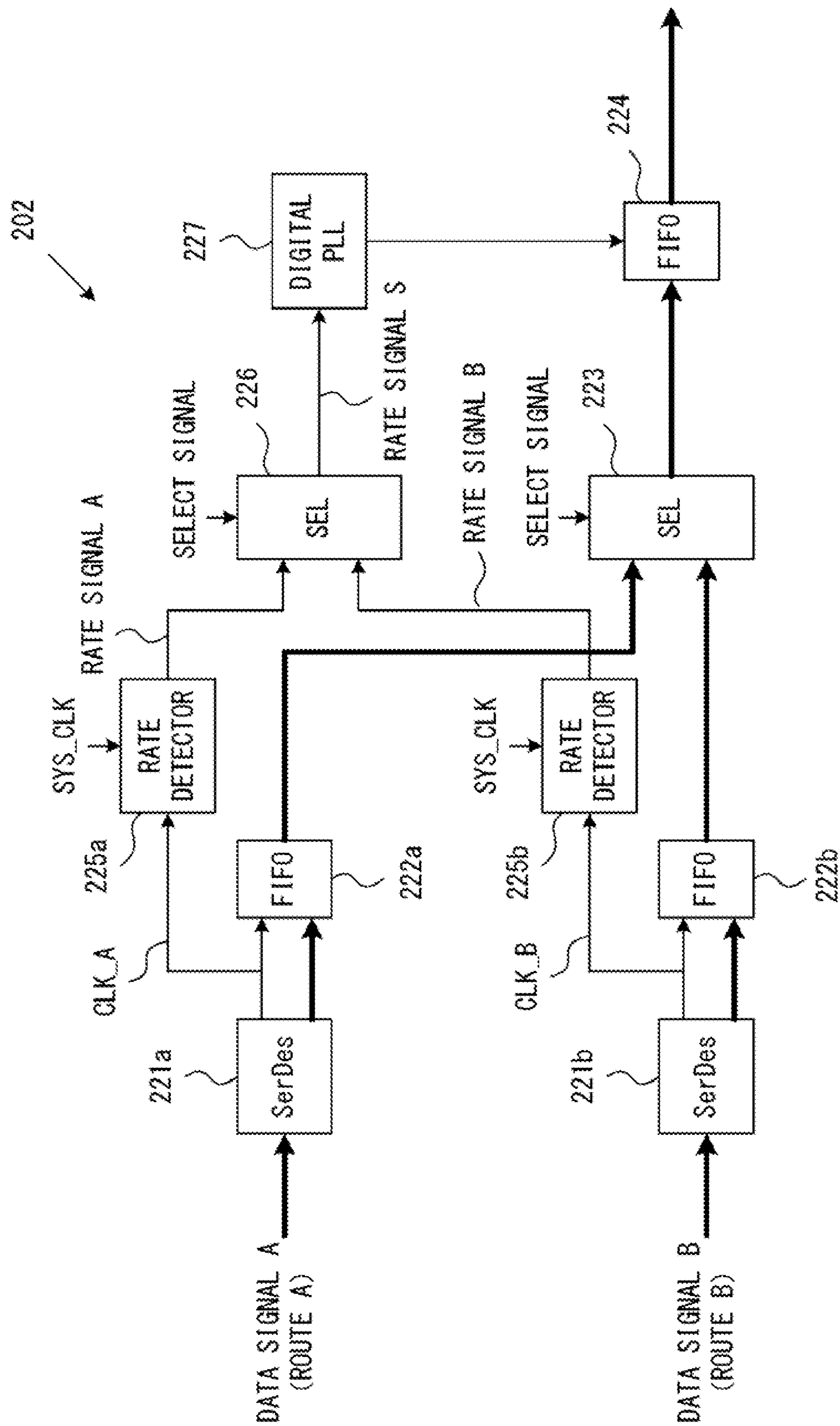
F I G. 1 2

OPTICAL TRANSMISSION DEVICE AND OPTICAL TRANSMISSION SYSTEM

CROSS-REFERENCE TO RELATED APPLICATION

This application is based upon and claims the benefit of priority of the prior Japanese Patent Application No. 2021-031566, filed on Mar. 1, 2021, the entire contents of which are incorporated herein by reference.

FIELD

The embodiments discussed herein are related to an optical transmission device and an optical transmission system

BACKGROUND

In order to improve the reliability of communication, optical communication systems may be redundantly configured. For example, two paths (a work path and a protection path) are established between a transmitting node and a receiving node. The transmitting node transmits the same packets via the two paths. That is, the same packets arrive at the receiving node through the two paths. The receiving node then receives the packet that arrived via the work path. When a failure occurs in the work path, the receiving node switches from the work path to the protection path, and then receives the packet arriving via the protection path. According to this configuration, communication is restored within a prescribed switching time (for example, 50 m seconds).

Meanwhile, a communication device that can suppress the occurrence of link down at the time of route switching has been proposed (for example, Japanese Laid-open Patent Publication No. 2012-034030).

In order to realize large-capacity optical communication systems, methods to increase the number of bits transmitted in a single symbol have been put into practical use. For example, in many existing optical communication systems, data is transmitted in NRZ (Non-Return to Zero). In NRZ, each symbol carries one bit. In contrast, in recent years, data transmission using PAM (Pulse Amplitude Modulation) 4 is being put into practical use. In PAM4, each symbol transmits two bits.

However, as the number of bits transmitted in one symbol increases, the recovery time from a failure may become longer. For example, when path switching is performed in the redundant configuration described above, the recovery time from a failure is 10 m seconds or less in NRZ, but may take several hundred seconds to several seconds in PAM4.

SUMMARY

According to an aspect of the embodiments, an optical transmission device includes: a first receiver circuit configured to convert an optical signal received via a first route into a first electric signal; a second receiver circuit configured to convert an optical signal received via a second route into a second electric signal; a switch circuit configured to select the first electric signal or the second electric signal; a terminator circuit configured to extract a packet from an electric signal selected by the switch circuit; a packet buffer configured to store the packet extracted by the terminator circuit; a clock generator configured to generate a clock signal; and a signal generator configured to generate a continuous signal that includes the packet stored in the packet buffer by using the clock signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical transmission system according to an embodiment of the present invention;

FIG. 2 illustrates an example of the configuration of an optical transmission device;

FIGS. 3A and 3B illustrate examples of the configurations of optical modules;

FIG. 4 illustrates an example of an optical transmission device according to an embodiment of the present invention;

FIG. 6 illustrates the extraction of packets;

FIG. 7 illustrates an example of the signal processing of a switch blade at the time of route switching according to an example for comparison;

FIG. 8 illustrates an example of the signal processing of the switch blade at the time of route switching according to an embodiment of the present invention;

FIG. 10 illustrates a clock system of an optical transmission system according to an embodiment of the present invention;

FIG. 11 illustrates an example of an optical transmission system and a protection circuit according to a variation of an embodiment of the present invention;

FIG. 12 illustrates another example of a protection circuit used in a variation of an embodiment of the present invention.

DESCRIPTION OF EMBODIMENTS

Figure 5:
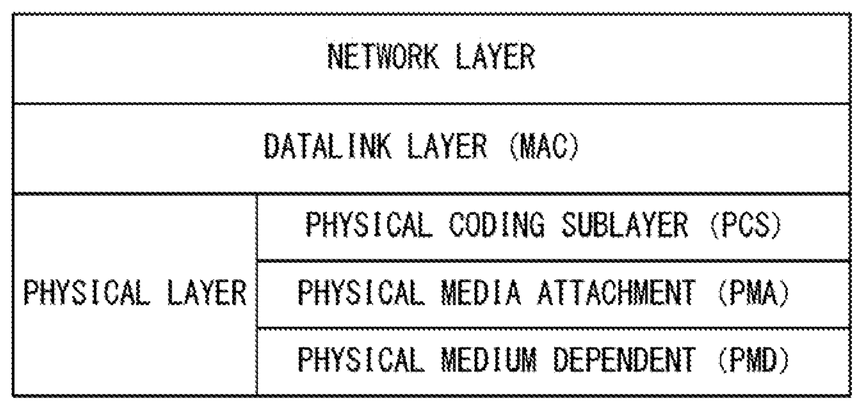
FIG. 5 illustrates a part of an OSI reference model.

FIG. 1 illustrates an example of an optical transmission system according to an embodiment of the present invention. In this example, an optical transmission system 1 is equipped with an optical transmission device 2 and an optical transmission device 3. The optical transmission device 2 and the optical transmission device 3 can transmit optical signals in both directions. However, in the following description, it is assumed that optical signals are transmitted from the optical transmission device 2 to the optical transmission device 3.

When the optical transmission device 2 receives a packet from a router 4, it forwards the packet to the optical transmission device 3. At this time, the optical transmission device 2 generates an optical signal to transmit the packet. In addition, the optical transmission device 2 is equipped with optical interface circuits 2*a* and 2*b*. The optical interface circuits 2*a* and 2*b* transmit the same optical signals to the optical transmission device 3. The optical signal transmitted from the optical interface circuit 2*a* arrives at the optical transmission device 3 through an optical network 6*a*. The optical signal transmitted from the optical interface circuit 2*b* arrives at the optical transmission device 3 through an optical network 6*b*.

The optical transmission device 3 is equipped with optical interface circuits 3*a*, 3*b*, a switch 3*c*, and an optical interface circuit 3*d*. The optical interface circuit 3*a* receives an optical signal transmitted from optical interface circuit 2*a* through the optical network 6*a*. The optical interface circuit 3*b* receives an optical signal transmitted from the optical interface circuit 2*b* through the optical network 6*b*. That is, the optical transmission device 3 receives the same signal via the two routes. Then, the optical interface circuits 3*a* and 3*b* convert the received optical signal into an electric signal, respectively. Meanwhile, in the following description, the route between the optical interface circuits 2*a* and 3*a* (that is, the optical network 6*a*) may be referred to as the "route A". Similarly, the route between optical interface circuits 2*b* and 3*b* (that is, the optical network 6*b*) may be referred to as the "route B".

The switch 3*c* selects one of the signal received via the route A or the signal received via the route B. For example, when the route A is designated as the work system, switch 3*c* selects the signal to be received via the route A. The optical interface circuit 3*d* converts the electric signal selected by the switch 3*c* into an optical signal and transmits it to a router 5.

In the optical transmission system with the above configuration, when a failure occurs, switching from the work system to the protection system is executed. For example, when the optical transmission device 3 detects a failure in the route A, the switch 3*c* selects the signal to be received via the route B. Then, this signal is forwarded to the router 5. Accordingly, the communication is restored.

FIG. 2 illustrates an example of the configuration of an optical transmission device. The optical transmission device 10 illustrated FIG. 2 corresponds to the optical transmission device 3 illustrated in FIG. 1. Therefore, the optical transmission device 10 receives the same optical signals via the route A and the route B.

The optical transmission device 10 is equipped with transponders (TRPN) 11*a*, 11*b*, and a switch blade 13. The transponders 11*a* and 11*b* correspond to the optical interface circuits 3*a* and 3*b* illustrated in FIG. 1, respectively. That is, the transponder 11*a* converts an optical signal received via the route A into an electric signal, and the transponder 11*b* converts an optical signal received via the route B into an electric signal. Then, the electric signals generated by each of the transponders 11*a* and 11*b* are guided to the switch blade 13 via electrical interfaces. "E" in FIG. 2 represents an electrical interface.

The transponders 11*a* and 11*b* are equipped with failure detectors 12*a* and 12*b*, respectively. Each of the failure detectors 12*a* and 12*b* can detect failures in the optical transmission line. For example, LOS (Loss of Signal) and/or LOFA (Loss of Frame Alignment) are detected. When the reception level of an optical signal is lower than a specified threshold, LOS is detected. Meanwhile, when a frame of a specified format fails to be detected from a received signal, LOFA is detected. Then, when a failure is detected, the failure detectors 12*a* and 12*b* generate an alarm signal. The alarm signal is sent to the switch blade 13. Note that the failure detectors 12*a* and 12*b* may be implemented in the switch blade 13.

The switch blade 13 is equipped with an electric switch (SW) 13*a*. In addition, an optical module 14 is connected to the switch blade 13. The electric switch 13*a* and the optical module 14 correspond to the switch 3*c* and the optical interface circuit 3*d* shown in FIG. 1, respectively.

The electric switch 13*a* selects either the signal received via the route A or the signal received via the route B. For example, if the route A is designated as the work system, the electric switch 13*a* selects the signal received via the route A. Then, the signal selected by the electric switch 13*a* is guided to the optical module 14.

FIG. 3A illustrates an example of the optical module 14 that is connected to the switch blade 13. The optical module 14 is equipped with a SerDes (Serialize/De-serialize) 21, SerDes 22, and an E/O circuit 23. In this example, eight 50 G electric signals are input to the optical module 14 in parallel. In addition, the SerDes 21 and the SerDes 22 respectively operate as a gearbox.

The SerDes 21 converts serial data into parallel data. As an example, a 1024-bit wide parallel signals are generated. In addition, the SerDes 21 is equipped with a clock recovery 21*a*. The clock recovery 21*a* recovers a clock signal CLK from an input signal. The recovered clock signal CLK is sent from the SerDes 21 to the SerDes 22. The SerDes 22 uses the clock signal CLK to convert parallel data into serial data. In this example, four 100 G electric signals are output. The E/O circuit 23 converts each 100 G electric signal into an optical signal. The wavelengths of the optical signals are different from each other. Then, the optical signals generated by the optical module 14 are transmitted to the router 5, as illustrated in FIG. 2.

An optical module 15 is connected to the router 5. The optical module 15 converts an optical signal received from the optical transmission device 3 into an electric signal. Then, the router 5 processes the received signal and forwards the signal to a destination.

FIG. 3B illustrates an example of the optical module 15 connected to the router 5. The optical module 15 is equipped with an O/E circuit 31, a SerDes 32, and a SerDes 33. In this example, four 100 G optical signals are input to the optical module 15 in parallel. Note that the SerDes 32 and the SerDes 33 respectively operate as a gearbox.

The O/E circuit 31 converts optical signals received from the optical module 14 illustrated in FIG. 3A into electric signals. The SerDes 32 converts serial data into parallel data. For example, 1024-bit wide parallel signals are generated. In addition, the SerDes 32 is equipped with a clock recovery 32*a*. The clock recovery 32*a* recovers a clock signal CLK from an input signal. The recovered clock signal CLK is sent from the SerDes 32 to the SerDes 33. The SerDes 33 uses the clock signal CLK to convert parallel data into serial data. In this example, eight 50 G electric signals are output.

The optical modules 14 and 15 are realized, for example, by QSFP-DD (Quad Small Form Factor Pluggable-Double Density). Meanwhile, the optical transmission device 10 and the router 5 may be connected by means of an optical interface or by an electrical interface.

In the optical transmission device 10 with the above configuration, the electric switch 13*a* can switch the route according to the alarm signal generated by the failure detectors 12*a* and 12*b*. For example, when the route A is the work system and the failure detector 12*a* generates an alarm signal, the electric switch 13*a* selects the signal to be received via the route B. By this route switching, the communication is restored.

However, in the configuration illustrated in FIG. 2, the output signal of the electric switch 13*a* is temporarily lost when the electric switch 13*a* switches the route due to a fault. That is, the input port of the optical module 14 temporarily enters the no-signal state (that is, LOS). Then, the SerDes 21 illustrated in FIG. 3A temporarily becomes unable to recover the clock signal. After this, when the route switching is completed in the electric switch 13*a*, the output signal of the electric switch 13*a* is guided to the SerDes 21. Then, the clock recovery 21*a* resumes recovery of the clock signal CLK.

Here, if the input signal is an NRZ signal, the clock recovery 21*a* can recover the clock signal CLK within a short time. For example, clock synchronization may be established in a few milliseconds. However, as the number of bits transmitted in one symbol increases, the time required for the clock recovery 21*a* to recover the clock signal CLK becomes longer. For example, if the input signal is a PAM4 signal, it may take several seconds before clock synchronization is established. Then, during the period in which the clock signal CLK is not recovered, the optical module 14 will output an abnormal signal. In this case, the router 5 will receive the abnormal signal. Then, the optical module 15 implemented in the router 5 is not able to recover the clock from the input signal. Therefore, the router 5 fails to obtain data.

Thus, when a failure occurs in the transmission route, the electric switch 13*a* switches the route. At this time, the output of the electric switch 13*a* temporarily enter a no-signal state, and therefore, it follows that the clock synchronization is also temporarily lost. That is, the optical module 14 connected to the optical transmission device 10 and the optical module 15 connected to the router 5 need to establish clock synchronization after the route switching. However, in the case in which the transmitted signal is a PAM4 signal, it takes a long time to establish the clock synchronization. Therefore, in the case in which the transmitted signal is a PAM4 signal, it may take a long time to restore communication. Therefore, the optical transmission device according to the present invention is equipped with a configuration that enables restoration of communication in a short time when the route is switched due to a failure.

FIG. 4 illustrates an example of an optical transmission device according to an embodiment of the present invention. An optical transmission device 100 according to an embodiment of the present invention is equipped with transponders 11*a*, 11*b*, and a switch blade 40. The optical transmission device 100 may be equipped with other circuits or functions not illustrated in FIG. 4. The transponders 11*a* and 11*b* are substantially the same in FIGS. 2 and 4. That is, the transponders 11*a* and 11*b* are equipped with the failure detectors 12*a* and 12*b*, respectively. Each of the failure detectors 12*a* and 12*b* is able to, for example, detect LOS and/or LOFA. Note that the failure detectors 12*a* and 12*b* may be implemented in the switch blade 40.

The switch blade 40 is equipped with an electric switch 13*a*, a physical layer processor 41, a packet buffer 42, a clock generator 43, and a physical layer processor 44. Also, an optical module 14 is connected to the switch blade 40. The switch blade 40 may be equipped with other circuits or functions not illustrated in FIG. 4. Note that the electric switch 13*a* and the optical module 14 are substantially the same as in FIGS. 2 and 4. That is, the electric switch 13*a* selects the signal received via the route A or the signal received via the route B. The optical module 14, for example, has the configuration illustrated in FIG. 3A.

The physical layer processor 41 and the physical layer processor 44 perform the signal processing of the physical layer. The physical layer corresponds to Layer 1 of the OSI reference model, for example.

FIG. 5 illustrates a part of the OSI reference model. In the OSI reference model, Layer 1 is the physical layer, Layer 2 is the data link layer (MAC layer), and Layer 3 is the network layer. The physical layer includes the Physical Coding Sublayer (PCS), the Physical Medium Attachment (PMA), and the Physical Medium Dependent (PMD).

The physical medium dependent performs digital decision on the input signal to generate a digital signal. At this time, in the case in which the transmission signal is a PAM4 signal, two bits are obtained from one symbol. The physical medium attachment converts serial data to parallel data. The physical coding sublayer extracts frames from the input signal. The extracted frames are then passed to the data link layer.

The physical coding sublayer divides the frame received from the data link layer into fixed-length blocks and encodes each fixed length block. The coding scheme is, for example, 64B/66B. In addition, a special coding block called "idle" is inserted in the time region where no frame exists (that is, IFG: Inter Frame Gap). The physical medium attachment converts parallel data into serial data. Then, the physical medium dependent performs waveform conversion for each symbol of the serial data. In the case in which the transmitted signal is a PAM4 signal, a two-bit logical value is assigned to four different signal levels.

FIG. 6 illustrates the extraction of packets. In the example illustrated in FIG. 6, a frame is created by adding a header and a trailer to client data such as an IP packet. The header contains control information. The trailer contains the FCS (Frame Check Sequence). In FIG. 6, H represents the header and T represents the trailer.

As described above, the physical coding sublayer divides the frame received from the data link layer into fixed-length blocks and encodes each fixed length block. At this time, a special bit pattern is inserted at the beginning of each frame. In addition, an idle signal is inserted in the time region where no frame exists (that is, IFG). Thus, a continuous signal is generated that does not contain a no-signal state. In the following description, a continuous signal that does not contain a no-signal state may be referred to as a "continuous signal".

When this continuous signal is received, the physical coding sublayer extracts the frame by detecting the special bit pattern described above. At this time, the idle signal is discarded. Then, the IP packet is obtained by removing the header and trailer from the frame.

The explanation goes back to FIG. 4. The physical layer processor 41 and the physical layer processor 44 mainly perform the processing of the physical coding sublayer (PCS). That is, the physical layer processor 41 extracts frames from the received signal. Specifically, the physical layer processor 41 extracts frames by detecting the special bit patterns described above in the received signal. Therefore, the physical layer processor 41 is an example of a terminator circuit configured to extract a packet from an electric signal selected by the electric switch 13*a*. At this time, the physical layer processor 41 may decode each code block. The extracted frames are then stored in the packet buffer 42. Alternatively, the switch blade 40 may extract IP packets from each frame as illustrated in FIG. 6 and store the IP packets in the packet buffer 42. Meanwhile, in the following description, for simplifying the explanation, the frames extracted by the physical layer processor 41 and the IP packets extracted from those frames may be referred to as "packets" without distinction. The packet buffer 42 is, for example, a FIFO (First-in First-out) memory, and it is able to store a prescribed amount of packets.

The clock generator 43 continuously generates a clock signal. That is, the clock generator generates a clock signal regardless of whether a signal is output from the electric switch 13*a* or not. Then, this clock signal is given to the physical layer processor 44. The clock generator 43 generates a clock signal having a frequency that is determined in advice for the interface between the optical transmission device 100 and the router 5.

The physical layer processor 44 processes the signals in synchronization with the clock signal generated by the clock generator 43. Specifically, when packets are stored in the packet buffer 42, the physical layer processor 44 reads the packets from the packet buffer 42 in synchronization with the clock signal and divides them into fixed-length blocks. Then, the physical layer processor 44 encodes each fixed-length block. Meanwhile, when there are no packets stored in the packet buffer, the physical layer processor 44 outputs an idle signal. The idle signal is realized by one or more code blocks having a prescribed bit pattern. Thus, the physical layer processor 44 is an example of a signal generator configured to generate a continuous signal that includes the packet stored in the packet buffer 42 by using the clock signal generated by the clock generator 43.

In this way, the physical layer processor 44 is able to continuously generate signals using the clock signal generated by the clock generator 43. That is, even in the case in which the output of the electric switch 13*a* is temporarily lost, the physical layer processor 44 is able to output a continuous signal synchronized with a clock having a prescribed frequency. Specifically, for example, the physical layer processor 44 outputs a continuous signal synchronized with a clock of a prescribed frequency even when the electric switch 13*a* performs route switching. Therefore, a signal that is synchronized with a clock having a prescribed frequency is continuously input to the optical module 14.

The optical module 14 processes the signal using a clock signal that is extracted from the input signal, as illustrated in FIG. 3A. Therefore, in the case in which a continuous signal synchronized with a clock having a prescribed frequency is output from the physical layer processor 44, the optical module 14 can continue signal processing. That is, the signal transmitted from the optical transmission device 100 to the router 5 will not be interrupted even when the electric switch 13*a* performs route switching.

In the router 5, the optical module 15 extracts the clock signal from the signal received from the optical transmission device 100 and processes the received signal using the clock signal, as illustrated in FIG. 3B. At this time, the signal transmitted from the optical transmission device 100 to the router 5 is not interrupted. Therefore, even when the electric switch 13*a* performs route switching, the optical module 15 can continuously receive the signal without performing a process to reestablish the clock synchronization.

FIG. 7 and FIG. 8 illustrate an example of the signal processing of the switch blade at the time of route switching. FIG. 7 illustrates the signal processing of the switch blade 13 illustrated in FIG. 2 as an example for comparison. FIG. 8 illustrates the signal processing of the switch blade 40 according to an embodiment of the present invention illustrated in FIG. 4. In FIG. 7 and FIG. 8, PA represents a packet arriving at the optical transmission device 10 or 100 via the route A. PB represents a packet arriving at the optical transmission device 10 or 100 via the route B. I represents the idle signal inserted into the IFG.

In both cases, the same signals are input to the electric switch 13*a* via the route A and B when the optical transmission route is normal. However, the delay times of the route A and the route B are generally not the same as each other. Then, the electric switch 13*a* selects the signal received via the route A or the signal received via the route B.

Here, in the cases illustrated in FIG. 7 and FIG. 8, it is assumed that, while the electric switch 13*a* is in the state in which the electric switch 13*a* selects the signal received via the route A, a failure occurs on the route A. In this case, the electric switch 13*a* switches the route according to the alarm signal given by the failure detector 12*a* implemented in the transponder 11*a*. That is, the electric switch 13*a* transitions from the state of selecting the signal received via route A to the state of selecting the signal received via route B. At this time, the output of the electric switch 13*a* temporarily enters the no-signal state (that is, LOS).

In the switch blade 13 illustrated in FIG. 2, the output signal of the electric switch 13*a* is guided to the optical module 14. For this reason, when the output of the electric switch 13*a* goes into the LOS state, in the optical module 14, the clock recovery 21*a* illustrated in FIG. 3A is not able to recover the clock. In this case, the optical module 14 will output an abnormal signal (or a meaningless signal). The shaded area in FIG. 7 represents an abnormal signal. In addition, in the case in which the transmission signal is a PAM4 signal, it is more difficult to recover the clock compared to the case in which the transmission signal is an NRZ signal. Therefore, when the output of the electric switch 13*a* goes into the LOS state even just temporarily, the time until the clock synchronization is reestablished in the clock recovery 21*a* becomes longer. As a result, communication may be lost for several hundred seconds to several seconds.

On the other hand, in the configuration according to an embodiment of the present invention illustrated in FIG. 4, the switch blade 40 is equipped with the clock generator 43 and the physical layer processor 44. The physical layer processor 44 continuously outputs the signal using the clock signal generated by the clock generator 43, even when the output of the electric switch 13*a* is in the LOS state. In the example illustrated in FIG. 8, when there are no packets to be transmitted are stored in the packet buffer 42, for example, the physical layer processor 44 outputs an idle signal. Therefore, the input of the optical module 14 does not go into the LOS state, and out of synchronization does not occurs in the optical module 14. As a result, since the optical module 14 continuously transmits a signal, the optical module 15 implemented in the router 5 does not lose synchronization.

Figure 9:
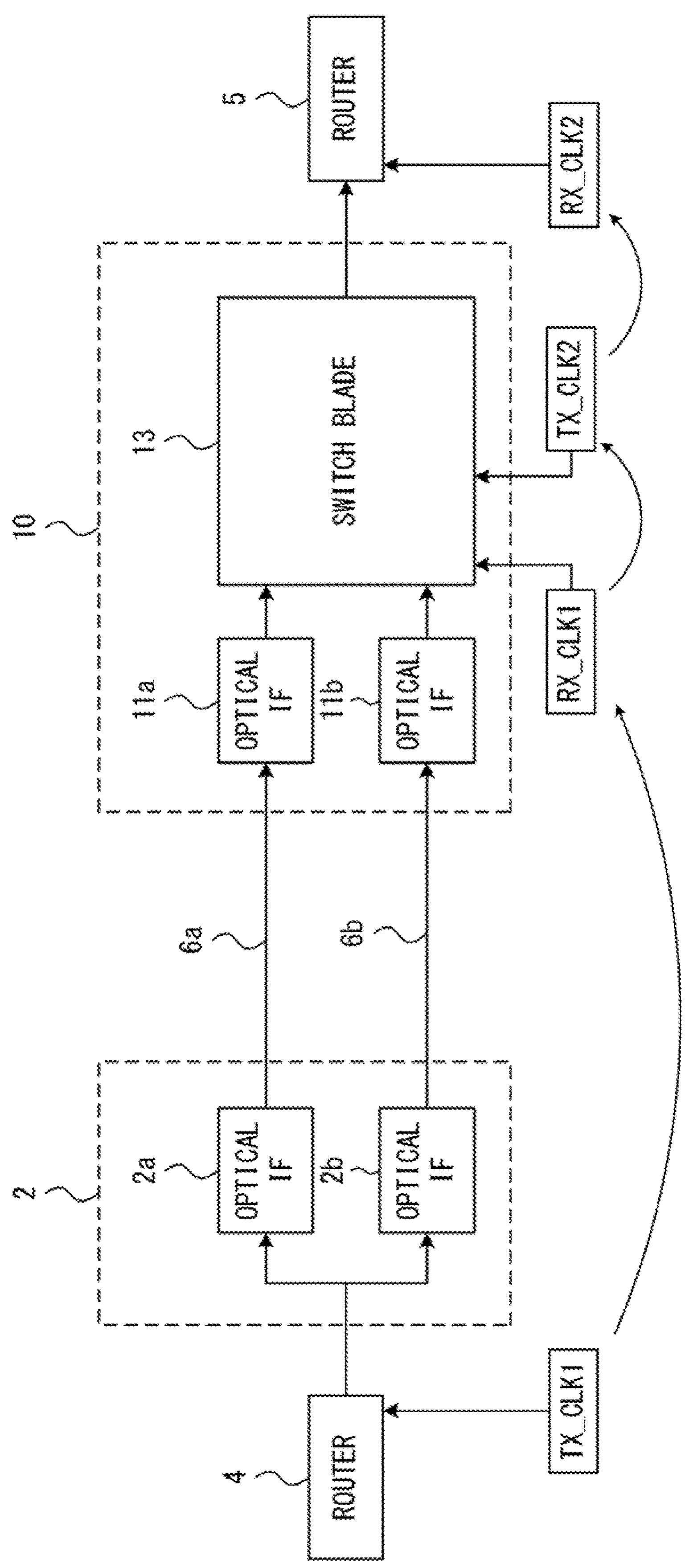
FIG. 9 illustrates a clock system of an optical transmission system according to an example for comparison.

FIG. 9 and FIG. 10 illustrate a clock system of an optical transmission system. FIG. 9 illustrates, as an example for comparison, an optical transmission system in which the optical transmission device 10 illustrated in FIG. 2 is implemented. FIG. 10 illustrates an optical transmission system in which the optical transmission device 100 according to an embodiment of the present invention illustrated in FIG. 4 is implemented. In the examples in FIG. 9 and FIG. 10, packets are transmitted from the router 4 to the router 5.

In the optical transmission system illustrated in FIG. 9, the router 4 transmits a signal synchronized with a clock TX_CLK1. This signal arrives at the optical transmission device 10 via the optical transmission device and the optical networks 6*a* and 6*b*. The optical transmission device 10 processes the received signal using a clock RXCLK1. Here, the clock RX_CLK1 is extracted from the received signal. That is, the clock TX_CLK1 and the clock RX_CLK1 are synchronized with each other. The optical transmission device 10 transmits the signal in synchronization with a clock TX_CLK2. Here, the clock RX_CLK1 and the clock TX_CLK2 are synchronized with each other in the optical transmission device 10. Then, the router 5 processes the received signal using a clock RX_CLK2. Here, the clock RX_CLK2 is extracted from the received signal. That is, the clock TX_CLK2 and clock RX_CLK2 are synchronized with each other. Thus, in the optical transmission system illustrated in FIG. 9, TX_CLK1, RX_CLK1, TX_CLK2, and RX_CLK2 are synchronized with each other.

Similar to the case illustrated in FIG. 9, in the optical transmission system illustrated in FIG. 10, the clocks TX_CLK1 and RX_CLK1 are synchronized with each other, and the clocks TX_CLK2 and RX_CLK2 are synchronized with each other. However, in the optical transmission device 100, the clock TX_CLK2 is generated by the clock generator 43 illustrated in FIG. 4. That is, the clock TX_CLK2 is generated without depending on the received signal. Therefore, even in the case in which the input signal is temporarily lost, the switch blade 40 can continue to output the signal stably.

Variation

In the cases illustrated in FIG. 1 through FIG. 4, the transmission rate is fixed. Therefore, the clock generator 43 generates a clock signal having a frequency that is determined in advance. In contrast, in order to build a flexible network, it is preferable to be able to support communications with various transmission rates.

FIG. 11 illustrates an example of an optical transmission system and a protection circuit for a variation of an embodiment of the present invention. In this example, packets are sent from a client 51 to a client 52. Transponders 53*a* and 53*b* transmit the same optical signals to an optical transmission device 200.

The optical transmission device 200 is equipped with transponders 201*a*, 201*b*, and the protection circuit 202. The transponders 201*a*, 201*b* receive optical signals transmitted from the transponders 53*a*, 53*b*, respectively. The transponders 201*a*, 201*b* generate an enable signal that represents the clock of the received signal.

The protection circuit 202 has a FIFO memory 211*a*, 211*b*, a selector 212, a FIFO memory 213, and a digital PLL 214. The FIFO memories 211*a* and 211*b* store data signals output from the transponder 201*a* and 201*b*, respectively. The selector 212 selects the data signal stored in the FIFO memory 211*a* or the FIFO memory 211*b*. The data signal selected by the selector 212 is stored in the FIFO memory 213. The digital PLL 214 generates an oscillation signal according to the enable signal corresponding to the data signal selected by the selector 212. Then, the protection circuit 202 reads and outputs the data signal from the FIFO memory 213 according to this oscillation signal.

In the optical transmission system with the above configuration, when a failure in the transmission route occurs, an alarm signal is given to the selector 212. Then, the selector 212 performs route switching according to the alarm signal. At this time, in order to shorten the recovery time, the input signal of the client 52 is required to be normal. That is, it is preferable that no loss of clock synchronization occurs at the input of the protection circuit 202.

However, in the protection circuit 202 illustrated in FIG. 11, when the selector 212 performs route switching, the digital PLL 214 performs retraining. That is, the digital PLL 214 temporarily stops. As a result, an abnormal signal is output from the protection circuit 202, and there is a possibility that the clock synchronization is lost in the protection circuit 202.

FIG. 12 illustrates another example of the protection circuit used in a variation of an embodiment of the present invention. The protection circuit 202 illustrated in FIG. 12 is implemented in the optical transmission device 200 illustrated in FIG. 11. Therefore, a data signal A and a data signal B are input from the transponders 201*a*, 201*b* to the protection circuit 202. The contents of the data signals A and B are the same as each other. However, the timing of the data signals A and B may be different from each other.

In this example, the protection circuit 202 is equipped with a SerDes 221*a*, a SerDes 221*b*, FIFO memories 222*a*, 222*b*, a selector 223, a FIFO memory 224, rate detectors 225*a*, 225*b*, a selector 226, and a digital PLL 227.

The SerDes 221*a* and the SerDes 221*b* convert the data signal A and the data signal B into parallel data, respectively. The parallel data output from the SerDes 221*a* and the SerDes 221*b* are stored in the FIFO memory 222*a* and the FIFO memory 222*b*, respectively. In addition, the SerDes 221*a* and the SerDes 221*b* extract clock signals (CLK_A and CLK_B), respectively, from the input signals. The parallel data output from the SerDes 221*a* and the SerDes 221*b* are stored in the FIFO memory 222*a* and the FIFO memory 222*b*, respectively. At this time, for example, each parallel data is written into the FIFO memory 222*a* and the FIFO memory 222*b* according to the clock signal CLK_A and the clock signal CLK_B respectively.

The selector 223 selects the output signal of the FIFO memory 222*a* or the output signal of the FIFO memory 222*b* according to the select signal. For example, during the normal operation, the select signal specifies the route A. In this case, the selector 223 selects the output signal of the FIFO memory 222*a*. Meanwhile, when an abnormality of the data signal A is detected, the select signal specifies the route B. In this case, the selector 223 transitions from the state in which the selector 223 selects the output signal of the FIFO memory 222*a* to the state in which the selector 223 selects the output signal of the FIFO memory 222*b*. Then, the signal selected by the selector 223 is stored in the FIFO memory 224. Meanwhile, the select signal is generated, for example, by a circuit that detects a failure in the transmission route.

A rate detector 225*a* and a rate detector 225*b* sample the clock signal CLK_A and the clock signal CLK_B with a system clock signal SYS_CLK to generate a rate signal A and a rate signal B, respectively. The system clock signal SYS_CLK is generated by a system clock generator that is not illustrated in the drawing. Meanwhile, the data stored in the FIFO memory 222*a* and the FIFO memory 222*b* may be read out according to the rate signal A and the rate signal B, respectively.

The selector 226 selects the rate signal A or the rate signal B according to a select signal. Here, the select signal given to the selector 226 is the same as the select signal given to the selector 223. Then, when the selector 223 selects the output signal of the FIFO memory 222*a*, the selector 226 selects the rate signal A. Meanwhile, when the selector 223 selects the output signal of the FIFO memory 222*b*, the selector 226 selects the rate signal B.

The digital PLL 227 generates an oscillation signal having the frequency represented by the rate signal selected by the selector 226 (in FIG. 12, a rate signal S). Then, data is output from the FIFO memory 224 in accordance with this oscillation signal.

Figure 13:
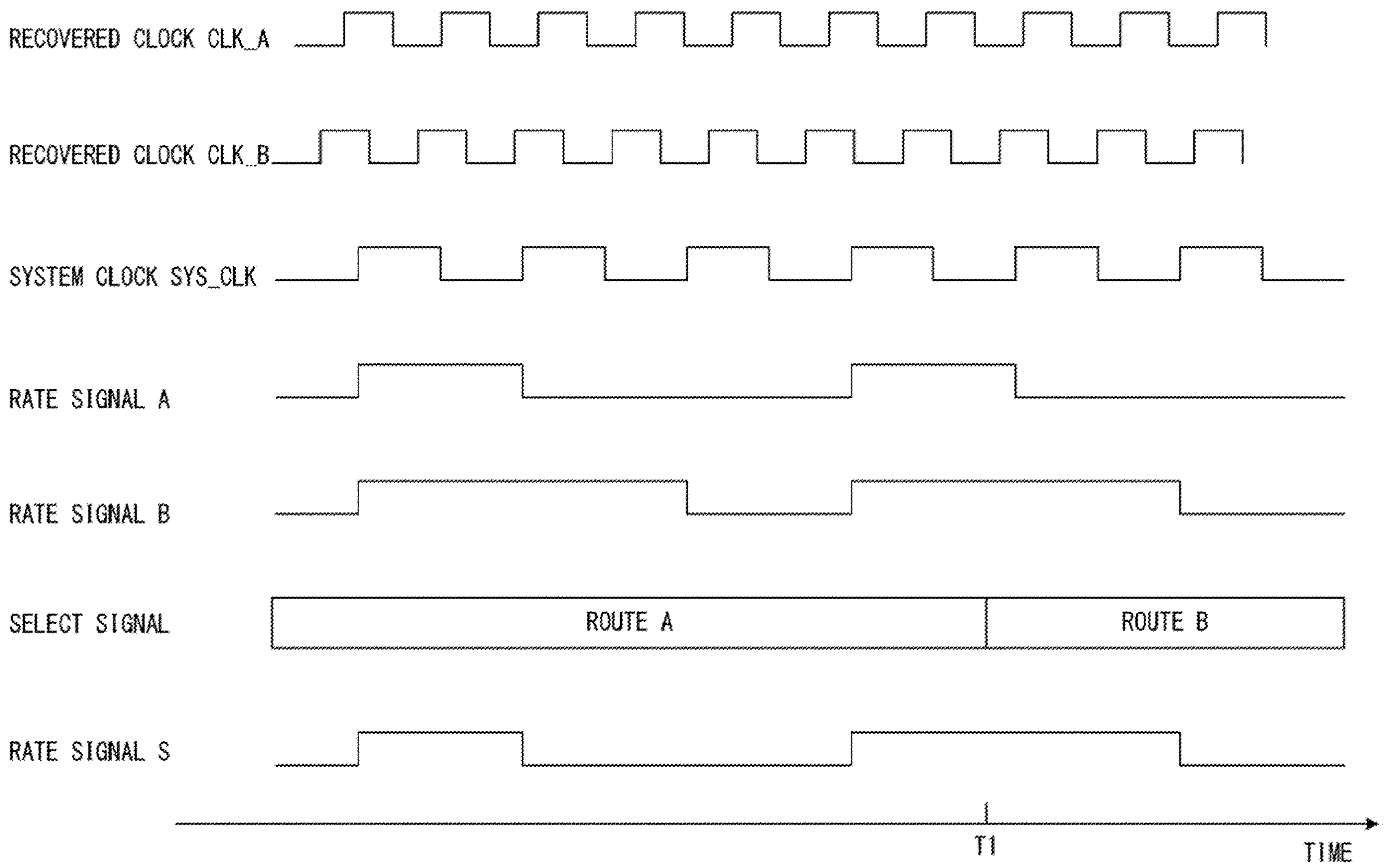
FIG. 13 is a time chart illustrating the operation of the protection circuit illustrated in FIG. 12.

FIG. 13 is a time chart illustrating an example of the operation of the protection circuit 202 illustrated in FIG. 12. In this example, before time T1, the select signal specifies the route A.

The rate signal A is generated by a sampling the clock signal CLK_A with the system clock signal SYS_CLK. Therefore, the rate signal A is synchronized with the system clock signal SYS_CLK, and the frequency of the rate signal A depends on the frequency of clock signal CLK_A. Meanwhile, the rate signal B is generated by sampling the clock signal CLK_B with the system clock signal SYS_CLK. Therefore, the rate signal B is synchronized with the system clock signal SYS_CLK, and the frequency of the rate signal B depends on the frequency of the clock signal CLK_B. Here, the frequencies of clock signals CLK_A and CLK_B are the same as each other. Therefore, the frequencies of the rate signal A and the rate signal B (that is, the rates represented by rate signal A and rate signal B) are the same as each other. However, the phases of clock signal CLK_A and clock signal CLK_ are not the same as each other. Therefore, the phases of the rate signal A and the rate signal B are not the same as each other either.

It is assumed that a failure is detected at time T1 and the select signal changes from "the route A" to "the route B". In this case, before time T1, the output signal of the selector 226 (the rate signal S in FIG. 13) is the rate signal A, and after time T1, the output signal of the selector 226 is the rate signal B. Here, both the rate signal A and the rate signal B are synchronized with the system clock signal SYS_CLK, and the selector 226 operates in synchronization with the system clock signal SYS_CLK. Therefore, even when route switching is performed due to a failure or the like, the output signal of the selector 226 is continuous, and the digital PLL 227 does not need to perform retraining.

Note that the phase of the output signal of the selector 226 (the rate signal S in FIG. 13) may change when the route switching is performed. Therefore, it is preferable that the FIFO memory 224 has a size large enough to absorb this phase change.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device comprising:
- a first receiver circuit configured to convert an optical signal received via a first route into a first electric signal;
- a second receiver circuit configured to convert an optical signal received via a second route into a second electric signal;
- a switch circuit configured to select the first electric signal or the second electric signal;
- a terminator circuit configured to extract a packet from an electric signal selected by the switch circuit;
- a packet buffer configured to store the packet extracted by the terminator circuit;
- a clock generator configured to generate a clock signal; and
- a signal generator configured to generate a continuous signal that includes the packet stored in the packet buffer by using the clock signal.

2. The optical transmission device according to claim 1, further comprising a failure detector configured to detect a failure in the first route and the second route, wherein
- when the failure detector detects a failure in the first route while the switch circuit is in a state in which the switch circuit selects the first electric signal, the switch circuit transitions from the state in which the switch circuit selects the first electric signal to a state in which the switch circuit selects the second electric signal.

3. The optical transmission device according to claim 1, wherein
- the continuous signal generated by the signal generator is a PAM (Pulse Amplitude Modulation) 4 signal in which one symbol transmits two bits.

4. The optical transmission device according to claim 1, wherein
- when a packet is stored in the packet buffer, the signal generator reads and outputs the packet stored in the packet buffer, and
- when a packet is not stored in the packet buffer, the signal generator outputs a bit pattern determined in advance.

5. The optical transmission device according to claim 1, further comprising an optical module configured to convert the continuous signal generated by the signal generator into an optical signal.

6. A switch blade comprising:
- a switch circuit configured to select a first electric signal that represents an optical signal received via a first route or a second electric signal that represents an optical signal received via a second route;
- a terminator circuit configured to extract a packet from an electric signal selected by the switch circuit;
- a packet buffer configured to store the packet extracted by the terminator circuit;
- a clock generator configured to generate a clock signal;
- a signal generator configured to generate a continuous signal that includes the packet stored in the packet buffer by using the clock signal.

7. An optical transmission system in which same optical signals are transmitted from a first optical transmission device to a second optical transmission device via a first route and via a second route, wherein
- the second optical transmission device comprises:
  - a first receiver circuit configured to convert an optical signal received via the first route into a first electric signal;
  - a second receiver circuit configured to convert an optical signal received via the second route into a second electric signal;
  - a switch circuit configured to select the first electric signal or the second electric signal;
  - a terminator circuit configured to extract a packet from an electric signal selected by the switch circuit;
  - a packet buffer configured to store the packet extracted by the terminator circuit;
  - a clock generator configured to generate a clock signal; and
  - a signal generator configured to generate a continuous signal that includes the packet stored in the packet buffer by using the clock signal.

8. An optical transmission device comprising:
- a first receiver circuit configured to generate a first data signal from an optical signal received via a first route;
- a second receiver circuit configured to generate a second data signal from an optical signal received via a second route;
- a first clock recovery circuit configured to recover a first clock signal from the first data signal;
- a second clock recovery circuit configured to recover a second clock signal from the second data signal;
- a first selector configured to select the first data signal or the second data signal;

a FIFO memory configured to store a data signal selected by the first selector;

a first rate detector configured to generate a first rate signal by sampling the first clock signal with a system clock signal that has a specified frequency;

a second rate detector configured to generate a second rate signal by sampling the second clock signal with the system clock signal;

a second selector configured to select the first rate signal or the second rate signal; and a digital PLL configured to generate an oscillation signal according to a rate signal selected by the second selector, wherein the data signal is read from the FIFO memory according to the oscillation signal.

* * * * *